United States Patent
Grison

(10) Patent No.: US 6,911,133 B1
(45) Date of Patent: Jun. 28, 2005

(54) AUTOMATED SYSTEM FOR ISSUING AND MANAGING OFFENCE TICKETS

(76) Inventor: Paul Grison, Les Mas de Pierrine - 16, Rue d'Opio, 06560 Valbonne (FR)

( * ) Notice: Subject to any disclaimer, the term of this patent is extended or adjusted under 35 U.S.C. 154(b) by 0 days.

(21) Appl. No.: 09/555,128

(22) PCT Filed: Nov. 24, 1998

(86) PCT No.: PCT/FR98/02509

§ 371 (c)(1), (2), (4) Date: May 25, 2000

(87) PCT Pub. No.: WO99/27474

PCT Pub. Date: Jun. 3, 1999

(30) Foreign Application Priority Data

Nov. 26, 1997 (FR) .............................. 97 14824

(51) Int. Cl.[7] .............................. G06F 17/60
(52) U.S. Cl. .............................. 205/40; 705/35; 705/36; 705/37; 705/38; 705/39; 705/41; 705/42; 705/43; 705/44; 705/45
(58) Field of Search ...................... 705/35–45

(56) References Cited

U.S. PATENT DOCUMENTS

| | | | |
|---|---|---|---|
| 2,023,102 A | 12/1935 | Sauer .............................. | 40/26 |
| 3,837,101 A | 9/1974 | Young .............................. | 40/21 |
| 5,488,558 A | 1/1996 | Ohki .............................. | 364/449 |
| 5,557,090 A | 9/1996 | Ganne et al. .............. | 235/449 |
| 5,845,268 A * | 12/1998 | Moore ........................ | 705/418 |
| 5,905,247 A * | 5/1999 | Ilen .............................. | 235/384 |
| 5,948,038 A * | 9/1999 | Daly et al. .................. | 701/117 |

FOREIGN PATENT DOCUMENTS

| | | | | |
|---|---|---|---|---|
| EP | 650125 | | 4/1995 | |
| EP | 671701 | | 9/1995 | |
| FR | 2665779 | | 2/1992 | |
| GB | 2219272 | | 12/1989 | |
| GB | 2 284 290 A | * | 5/1995 | ............ G08G/1/00 |

OTHER PUBLICATIONS

Guardian, UK: First Pay to Drive Trial In Leicester, Jul., 23, 1997, pp. 1–2.*

* cited by examiner

Primary Examiner—Jeffrey Pwu
Assistant Examiner—Richard Fults
(74) Attorney, Agent, or Firm—James C. Lydon

(57) ABSTRACT

The invention concerns a system for issuing and managing offence tickets comprising a portable input device provided to the policeman for recording therein data concerning the contravening vehicle, a ticket medium to be issued to the vehicle owner and adapted to be inserted in the input device for recording therein input data from the input device, and an accession device provided with a display screen and means for inserting the tickets medium to enable the vehicle owner to access data concerning the offence displayed on the screen. The ticket medium consists of an unalterable tamper-resistant smart card and clipping means enabling the policeman to clip the card on the wiper arm, such that the card is not damaged by rain and cannot be easily removed after it has been clipped.

10 Claims, 4 Drawing Sheets

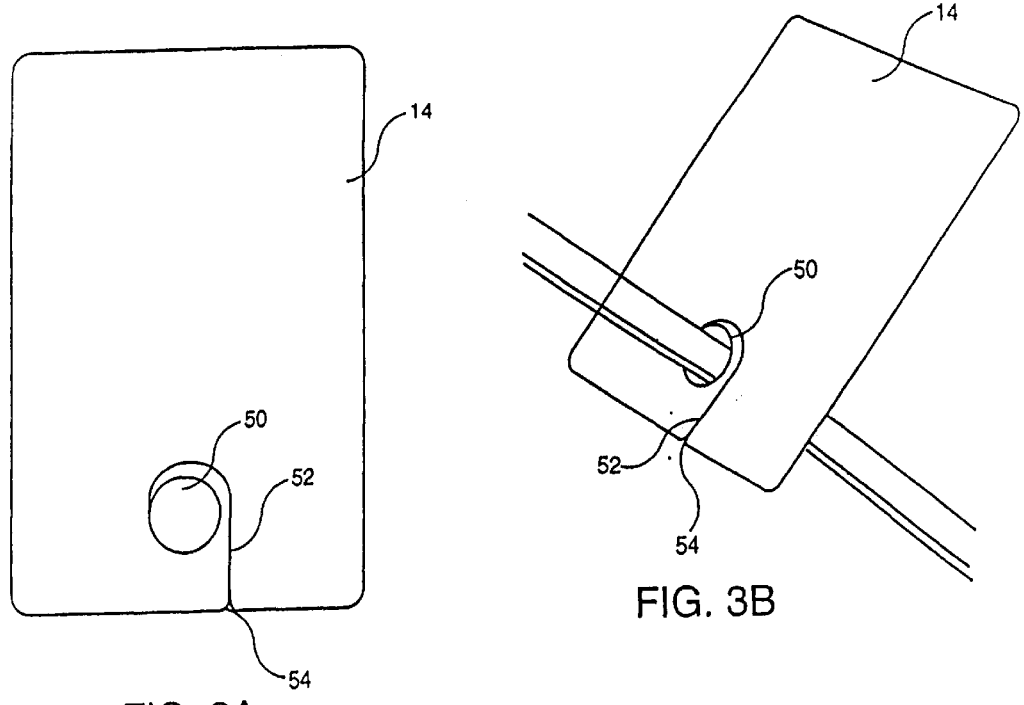
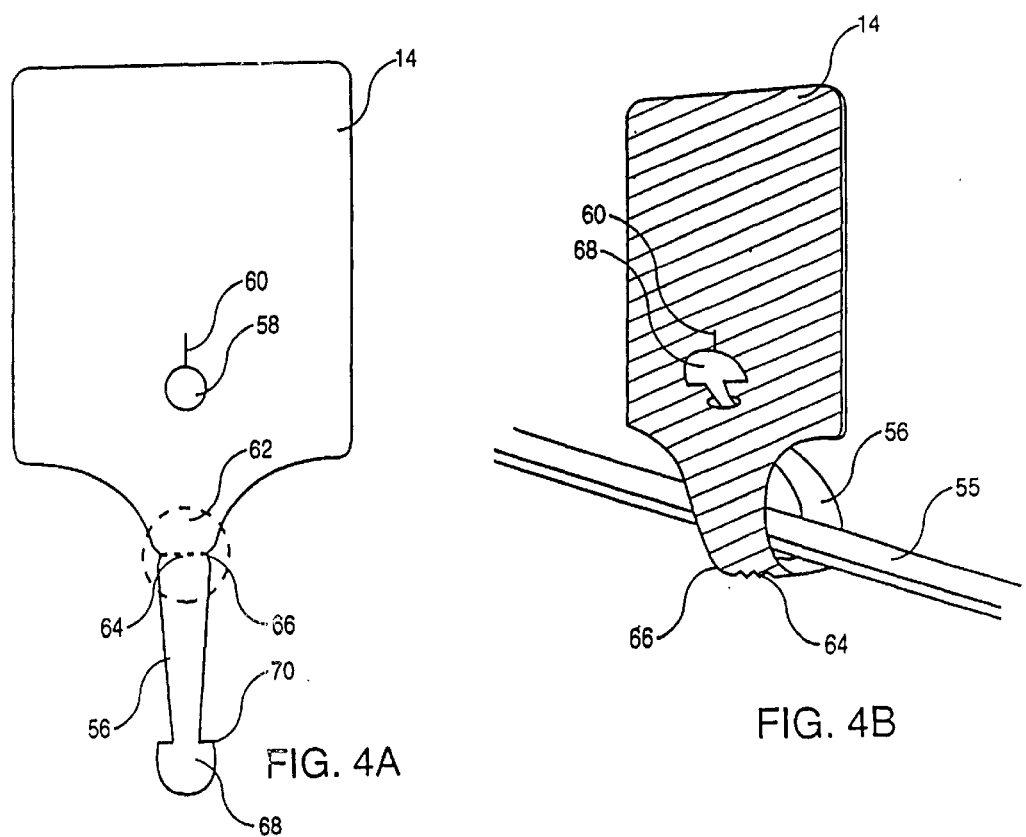

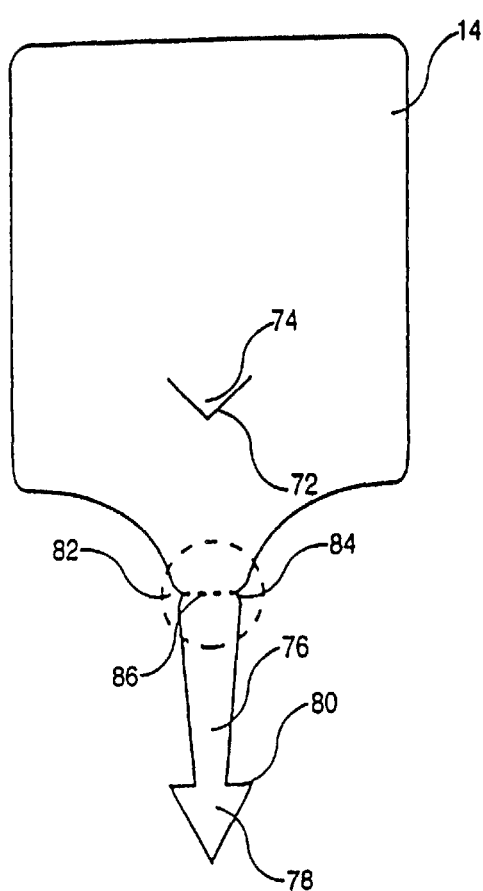
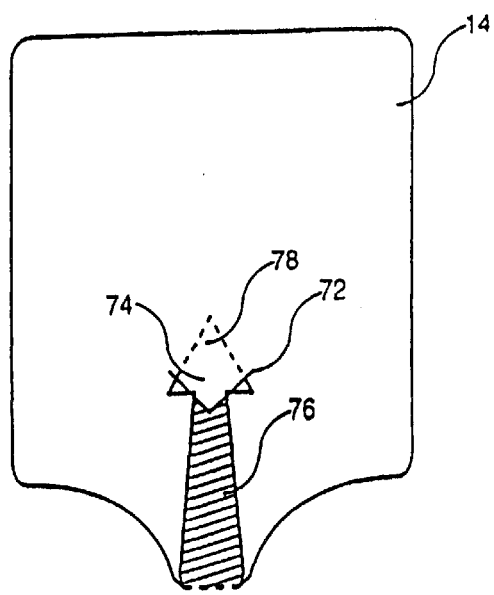
FIG. 5A
FIG. 5B

AUTOMATED SYSTEM FOR ISSUING AND MANAGING OFFENCE TICKETS

This application is a U.S. national stage of International Application PCT/FR98/02509 filed Nov. 24, 1998.

TECHNICAL FIELD

The present invention concerns the establishment and the payment of offence tickets issued by policemen in charge of ticketing vehicles parked illegally on public thoroughfares or guilty of other traffic offences, and relates particularly to an automated system for issuing and managing these offence tickets.

BACKGROUND ART

Currently, in France, the ticketing of vehicles on public thoroughfares by a police officer or traffic warden is carried out by manually filling in the date, time and parking location, as well as vehicle-related information such as the license number, make, etc. Once completed, the ticket is placed under the vehicle's windshield wiper. When in possession of this document, the owner of the ticketed vehicle pays the fine by buying a fine stamp in a tobacconist's shop. The stamp is then pasted on the ticket and sent to the Public Treasury.

Actually, this system presents several disadvantages. Specifically, the police officer who issued the ticket is faced with a tedious and time-consuming task as he must fill in, by hand and in duplicate, all of the information on the ticket and in the ticket book. This takes a considerable amount of time and is not particularly efficient. Furthermore, the administrative processing of the tickets is very difficult to manage.

Another major disadvantage stems from the fact that the ticket is placed under the vehicle's windshield wiper. If it rains once the ticket is placed on the vehicle's windshield, it becomes wet or even soaked, difficult to handle and often altered, making it unusable for the payment operation. In addition, as the tickets are simply placed under the windshield wiper, they are sometimes removed as a joke or removed by dishonest motorists who place the ticket under the windshield wiper of their own vehicle in an attempt to avoid having a police officer place a ticket on it thinking that the vehicle has already been ticketed. In such cases, the ticketed motorist is not aware that he/she received a ticket and will thus have to pay a higher fine when claimed at a later date, thereby increasing the already high volume of disputed tickets.

An offence ticket processing system described in patent application FR-A-2.665.779 enables a certain number of the above-mentioned disadvantages to be solved. This system consists of a portable self-contained terminal featuring an alphanumeric keyboard, a screen and a printer capable of printing a barcode on the traffic ticket entered by the police officer using the keyboard. A microcomputer in the police station is connected to the portable terminals via a connecting cable for the purpose of collecting and processing the information gathered by the police officer. A payment terminal, also located in the police station, features a ticket reader enabling the vehicle owner to pay his/her fine.

Unfortunately, insofar as the system described in document FR-A-2.665.779 still uses tickets made of paper or other alterable material, the disadvantage of having the ticket ruined by rain still exists, particularly as the alteration of one or more bars of the barcode is all that would be necessary to make it unusable in case of rain.

In the same manner, this type of ticket can still be easily removed from the ticketed vehicle and placed on another vehicle. Another disadvantage inherent to this type of system is due to the use of a printer which is either bulky and heavy or miniaturized and thus not very reliable. In all cases, the printer is liable to breakdown as it operates in an environment subjected to inclement weather. Finally, the barcodes can be easily falsified by an offender who wants to add or remove bars, thus making way to unacceptable forging possibilities in this sensitive application field, the implementation of which must be based on total security and reliability.

SUMMARY OF THE INVENTION

This is why an object of the invention is to provide a system for issuing and managing offence tickets which uses an unalterable tamper-resistant smart card type electronic support for recording the offence ticket data.

Another object of the invention is to provide a system for issuing and managing offence tickets using a support which can be clipped onto the violating vehicle's windshield wiper so as to discourage anyone other than the vehicle owner from removing said support.

The invention is thus a system for issuing and managing offence tickets comprising a portable input device provided to the police officer in charge of ticketing a contravening vehicle for recording therein data concerning the vehicle, a ticket medium to be issued to the vehicle owner and adapted to be inserted in the input device for recording therein input data relative to the vehicle, entered by the police officer using the portable input device, and a viewing device provided with a display screen and means for inserting the ticket medium to enable the vehicle owner to access data concerning the offence displayed on the screen. The ticket medium consists of an unalterable tamper-resistant smart card in which the information entered by the police officer is recorded and clipping means enabling the police officer to clip the card on the wiper arm, such that the card is not damaged by rain and cannot be easily removed after it has been clipped.

BRIEF DESCRIPTION OF THE DRAWINGS

The purposes, objects and features of the invention will become more apparent from the following detailed description with reference to the accompanying drawings, in which:

FIGS. 4A and 4B represent a second embodiment of the electronic ticket card used in the system according to the invention and, FIGS. 5A and 5B represent a third embodiment of the electronic ticket card used in the system according to the invention.

DETAILED DESCRIPTION OF THE INVENTION

Figure 1:
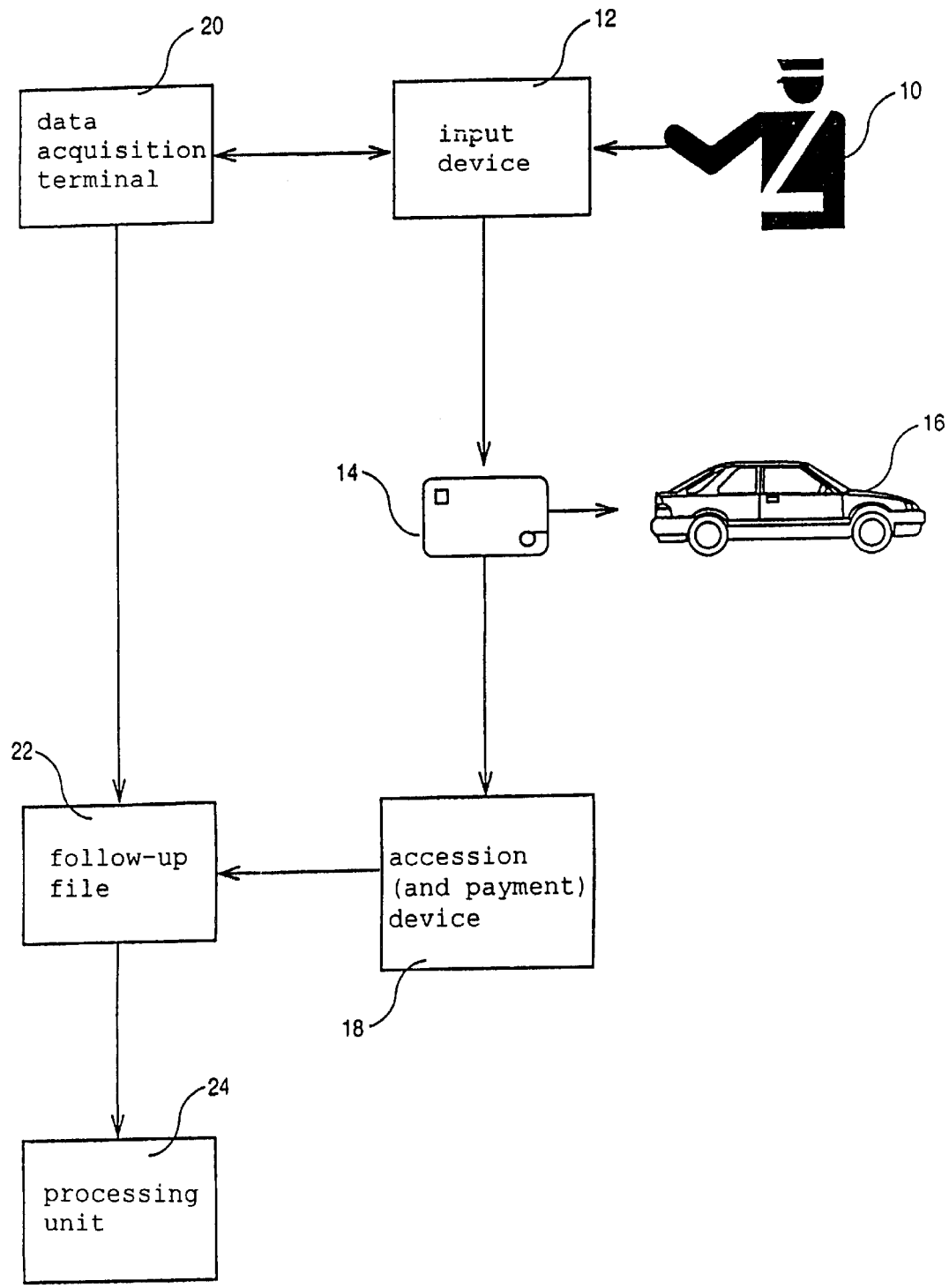
FIG. 1 is a block diagram which schematically represents all of the elements of the system for issuing and managing offence tickets according to the invention.

As depicted diagrammatically in FIG. 1, the police officer (or traffic warden) 10 is equipped with an input device 12 enabling him/her to issue a contravening vehicle 16 a ticket card 14 which is a clippable electronic card of smart card type, this unalterable tamper-resistant card comprising the essential element of the system for issuing and managing offence tickets according to the invention. The input device 12 is in the form of a small hand-held unit, for example 20 cm long, 10 cm wide and 3 cm thick. It is equipped with a hermetic alphanumeric keyboard, a screen with two lines having 16 characters each, a card on which the electronic components are mounted, a rechargeable battery, a date/time stamping function and a smart card reader/recorder for the card type 14. It enables complex security algorithms to be computed in complementarity with those of the card 14, and corresponding certificates to be written.

The offense ticket medium 14 is a plastic smart card which is rendered unalterable and tamper-resistant by the use of complex algorithms and the storage of information in tamperproof zones, in which it is possible to record or read data. Preferably, the card is disposable, non-reusable, fully protected, especially from being copied. Providing these features is the only means of ensuring totally secure data processing.

Figure 2:
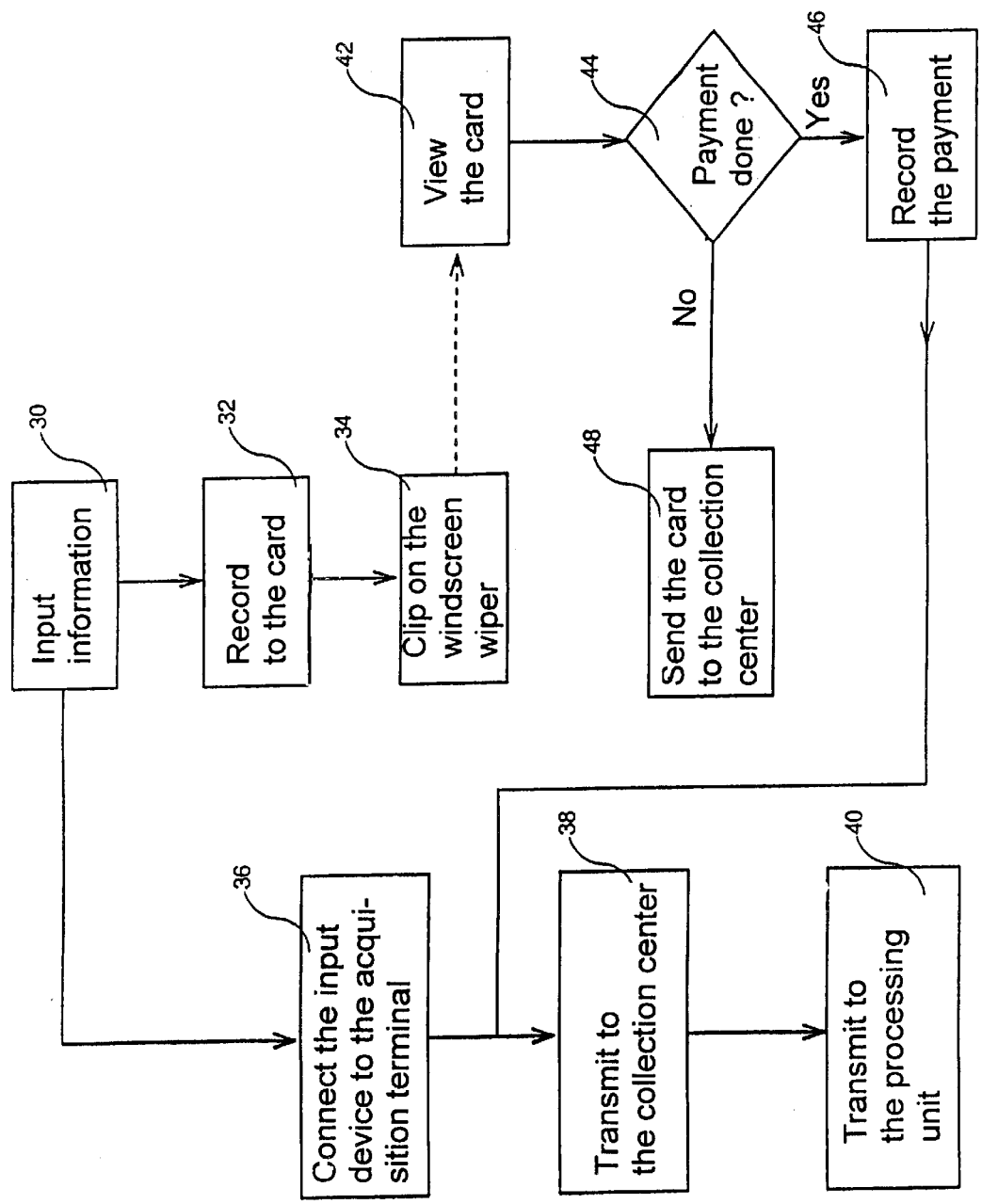
FIG. 2 is a flow chart representing the operations to be performed in the system according to the invention, as shown in FIG. 1, FIGS. 3A and 3B represent an initial embodiment of the electronic ticket card used in the system according to the invention.

The operation of the system according to the invention illustrated in FIG. 1 is depicted by the flow diagram represented in FIG. 2. Firstly, the data is entered (30) by the police officer or traffic warden who inputs the information by means of the keyboard of the portable input device 12. This information includes the vehicle type, make, the license number, the date, time, the type and nature of the offence, the fine, his/her identification number and the offence ticket number.

This information is then recorded (32) on the card 14 which the police officer inserts into the reader of the input device 12. Once the recording operation is completed, he/she removes the card from the portable input device 12 and clips it on the windshield wiper of the contravening vehicle (34) by a clipping means as described below.

At the end of his/her duty period, the police officer or the traffic warden returns to the police station where he/she connects (36) his/her portable input device 12 to a data acquisition terminal 20 which could be a simple docking station where the connection is established when the input device is placed on it. When the connection is established, the data entered by the police officer at the time of entering the information relative to the offence tickets is automatically transmitted (38) to a collection center where it is stored in a follow-up file for a certain period of time (preferably 3 or 4 days). Access to this follow-up file is only authorized to duly empowered individuals, such as police commissioners for example. In this manner, a police commissioner may be lenient on an offender and remove the offence from the follow-up file during this storage period.

Once the storage period in the follow-up file has terminated, the information is automatically transmitted (40) to a processing unit 24. It should be noted that several processing units may exist.

Upon returning to the vehicle, the vehicle owner recovers the card 14 by unclipping it from the windshield wiper and consults it (42) by means of a viewing device 18 which may be located in a tobacconist's shop or in a tax office. Such a device includes a display screen on which all of the information concerning the offence is displayed as soon as the ticket card is inserted into the slot provided for this purpose. It should be noted that the viewing devices may also be consultation terminals installed in strategic locations such as service stations, supermarkets, parking lots, etc.

A viewing device 18 may also be used to allow the offender, or any other person in possession of the ticket card, to pay the fine. In the case where this payment may be made (44), the person responsible for collecting the payment at the tobacconist's shop or tax office records (46) this payment in the viewing (and payment) device 18 and a receipt is issued to the person making the payment. It should be noted that if the viewing device is a payment terminal, payment can only be made by bank card. In the case where the viewing device does not also serve as a payment terminal, payment may be made by either purchasing a fine stamp which is pasted on the ticket card before being sent (48) by mail to the collection center, or by sending a check and the offence ticket or any other appropriate means of payment.

The fines collected with a viewing (and payment) device 18 are preferably transmitted to the collection center at night when the place of payment is closed. In this last case, each payment, whether made by one of the viewing and payment devices or by sending the ticket card with its fine stamp or check, removes the offence from the follow-up file 22 if payment is made during the storage period, or is transferred to the processing unit 24 concerned at the end of this period. In addition to receiving fine payments, it should be noted that the role of the processing unit 24 is to send out reminders and apply late fees for payment delays and to handle information requests and appeals.

In order to prevent it from being removed too easily from the windshield of the contravening vehicle, the ticket card is equipped with a clipping means described below.

According to an initial embodiment, which is not restrictive, illustrated in FIGS. 3A and 3B, the ticket card 14 includes an opening 50 having a slot 52 continuing down its side. A special cut-out 54 is made at the outside end of this slot on the edge of the card.

The card is clipped by pressing the special cut-out 54 against the wiper arm 55. The cut-out makes separating the slot 52 easier and facilitates the installation by pivoting the card on the wiper arm until the arm is fully within the orifice 50. The type of material used to make these cards enables its deformation characteristics to be used in attaching it to the wiper arm 55. The stiffness of the material provides efficient means of clipping the card onto the wiper arm.

According to a second embodiment illustrated in FIGS. 4A and 4B, the card 14 is prolonged by a tab 56. An opening 58 and a slot 60 are cut in this card. A frangible zone 62 is created on the tab through a perforated line 64 having special notches 66 at each end enabling the tab portion 56 to be separated from the rest of the card when a certain amount of force is applied. The end of tab features a rounded penetration head 68 preceded by two flat sections 70 used to block the tab. The head 68 is larger that the diameter of the orifice 58. The width of the tab in front of the blocking flat sections 70 is slightly less than the diameter of the orifice 58.

As shown in FIG. 4B, the rounded head 68 has returned to the same plane as the rest of the card. The respective dimensions of each component part of the assembly enabled this operation. The head was only able to enter the orifice 58 owing to the slot 60. The assembly is locked in place by the two flat sections 70. In this manner, as the tab 56 has been previously placed around the wiper arm 55, the assembly becomes solidly attached to the latter. To remove the ticket card from the arm 55, one simply has to pull on the card. The two special notches direct the traction force toward the perforations 64 causing the tab 56 to tear and separate from the rest of the card and thus preventing its future reuse. According to a third embodiment illustrated by FIGS. 5A and 5B, the card 14 includes a downward-pointing V-shaped slot 72, thereby creating a flap 74 which is slightly mobile owing to the card's plastic material. This card is prolonged by a tab 76. It is terminated by a variable-shaped head 78, either rounded or pointed, and equipped with two blocking flat sections 80. As described in the previous case, a frangible zone 82 is created. The card is attached by inserting the head 78 underneath the mobile flap 74 owing to the special downward-pointing V-shaped slot 72 which enables this maneuver. Locking takes place automatically by pulling on the tab 76. The tab is separated from the rest of the card at the frangible zone 82 which includes the means preventing the card from being reused consisting of notches 84 and perforations 86.

What is claimed is:

1. A system for issuing and managing offence tickets comprising:
    an electronic portable input device provided to a police officer in charge of ticketing a contravening vehicle for recording therein data concerning said vehicle,
    a ticket medium to be issued to the owner of said vehicle and adapted to be inserted in said input device for recording therein input data from said input device by the police officer, and
    an electronic viewing device provided with a display screen and means for inserting the ticket medium in said viewing device to enable the vehicle owner to access data concerning the offence displayed on said screen;
    wherein said ticket medium comprises an unalterable tamper-resistant electronic smart card in which the information entered by the police officer are recorded and clipping means enabling the police officer to clip the card on the wiper arm, such that said card is not damaged by rain and cannot be easily removed after it has been clipped.

2. A system according to claim 1 in which said viewing device is at the same time a payment device enabling the vehicle owner to pay the fine, the information relative to which were recorded in the ticket card.

3. A system according to claim 2, further including a data acquisition terminal to which said portable input device is connected in order to transfer into said acquisition terminal the information relative to the offences previously recorded in said input device.

4. A system according to claim 3, further including a collection center connected directly to said data acquisition terminal and having a follow-up file designed to record the information transmitted by said data acquisition terminal during a predetermined time prior to processing.

5. A system according to claim 4, in which the payments of said offence tickets made with said viewing device are transmitted to said follow-up file located in said collection center.

6. A system according to claim 5, further including a processing unit connected to said collection center and designed to process the offence tickets, the information of which was transferred to it by said collection center.

7. A system according to claim 1 in which the clipping means of the ticket medium comprise an opening prolonged by a slot terminated on the edge of the card by a special notch enabling the wiper arm to be inserted into the slot until it penetrates said opening.

8. A system according to claim 1, in which said clipping means of the ticket medium comprise a tab with a rounded head at its end and an opening and a slot enabling the introduction of said rounded head in said opening after the tab has been placed around the wiper arm, said rounded head being blocked as it is larger than the diameter of said opening.

9. A system according to claim 1, in which said clipping means of the ticket medium comprise a tab having a triangular head and two flat sections at its tip and a V-shaped slot enabling the insertion of said triangular head in said slot after said tab has been placed around the wiper arm, and its locking owing to said flat sections of the triangular head.

10. A system according to claim 8, in which said tab includes a frangible zone having perforations enabling the ticket card to be separated from the tab remaining around the wiper arm by exerting a certain pulling force.

* * * * *